United States Patent [19]
Essert

[11] Patent Number: 5,450,517
[45] Date of Patent: Sep. 12, 1995

[54] RE-ENTERABLE FIBER OPTIC SPLICER FOR DATA COMMUNICATIONS

[75] Inventor: Robert Essert, Glen Ellyn, Ill.

[73] Assignee: The Whitaker Corporation, Wilmington, Del.

[21] Appl. No.: 269,688

[22] Filed: Jul. 1, 1994

[51] Int. Cl.[6] .............................................. G02B 6/36
[52] U.S. Cl. ..................................... 385/135; 385/99
[58] Field of Search ...................... 385/69, 70, 65, 99, 385/95, 86, 87, 135, 136, 137

[56] References Cited

U.S. PATENT DOCUMENTS

| | | | |
|---|---|---|---|
| 4,046,454 | 9/1977 | Pugh, III | 350/96 |
| 4,634,216 | 1/1987 | Calevo et al. | 385/65 |
| 4,729,625 | 3/1988 | Loscoe et al. | 385/99 |
| 4,974,925 | 12/1990 | Troutman et al. | 385/99 |
| 5,121,456 | 6/1992 | Essert et al. | 385/70 |
| 5,134,678 | 7/1992 | Essert | 385/70 |
| 5,201,019 | 4/1993 | Gallasser et al. | 385/99 |

Primary Examiner—Rodney B. Bovernick
Assistant Examiner—John Ngo

[57] ABSTRACT

A re-enterable splicer assembly is provided for forming a re-enterable splice connection between respective ends of a pair of fiber optic cables, each cable comprising at least one optical fiber surrounded by an outer jacket and a quantity of fibrous strengthening material intermediate the outer jacket and the optical fiber. The splicer assembly comprises a splice portion having an elongate channel formed thereon for receiving and effectively joining respective ends of a pair of optical fibers, retaining structure for retaining the ends of the optical fibers received in the elongate channel, and an arrangement for partially opening the splice portion to facilitate inserting and releasing a fiber relative to the elongate channel. An elongate housing includes opposite outer housing sections configured for receiving respective outer jackets of fiber optic cables therein and an intermediate housing section between the respective outer housing sections configured for receiving the splice portion therein. The splicer assembly also includes an arrangement for securing the fibrous strengthening material relative to the elongate housing.

16 Claims, 3 Drawing Sheets

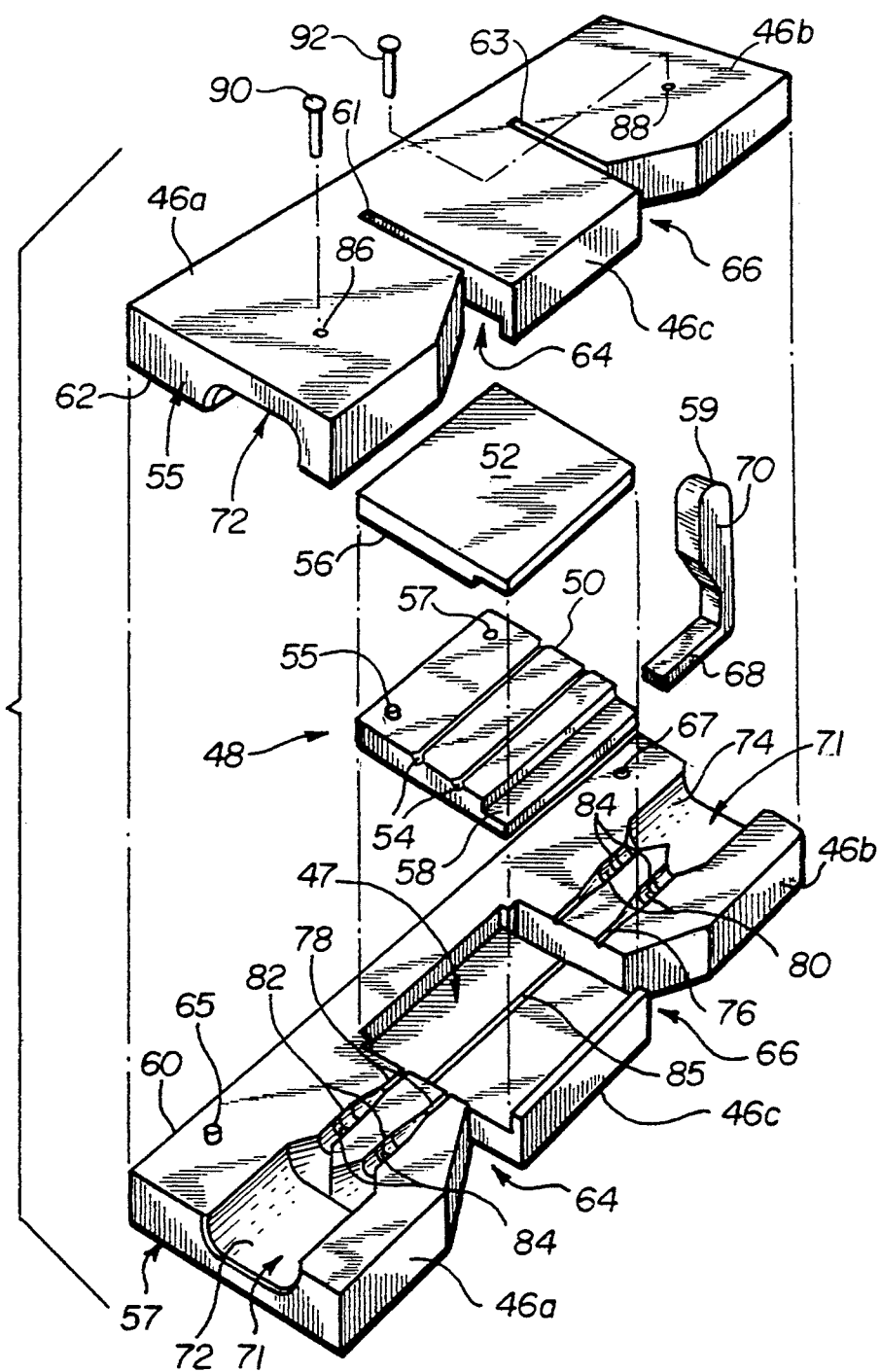
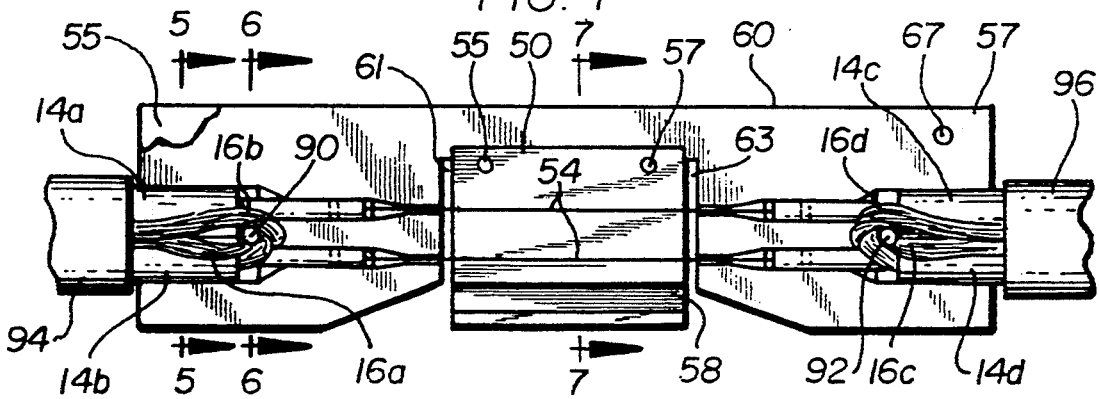

RE-ENTERABLE FIBER OPTIC SPLICER FOR DATA COMMUNICATIONS

BACKGROUND OF THE INVENTION

This invention is directed generally to fiber optic splicers, and more particularly to a novel and improved re-enterable fiber optic splicer assembly adapted for splicing ends of fiber optic cables of the type used for data communications.

Re-enterable fiber optic splicer assemblies particularly designed for splicing telecommunications fiber optic cables are shown in prior U.S. Pat. Nos. 5,121,456 and 5,134,678, which are owned by the same assignee as the present invention. However, data communications fiber optic cables differ from telecommunications fiber optic cables in a number of respects. Typically, telecommunications fiber optic cables are constructed for outdoor use whereas data communications fiber optic cables are normally constructed for indoor use.

Moreover, telecommunications fiber optic cables normally comprise a relatively large number of individual optical fibers, which are bundled together in a relatively large cable having a relatively heavy, environmentally resistant and structurally strong outer jacket surrounding the entire bundle of optical fibers. The outer jacket provides the necessary structural strength for providing strain relief at points where the cable is to be clamped or otherwise held at entry/exit points to various enclosures, such as splice enclosures or the like. When the individual optical fibers are out to be spliced, the outer jacket is cut away to reveal a suitable length of optical fiber and the fibers are individually guided to splicer assemblies, for example of the type shown in the above-referenced U.S. patents, to be individually spliced or joined to optical fibers of a second similar telecommunications fiber optic cable.

In contrast, a data communications fiber optic cable typically comprises a pair of joined, individually jacketed optical fibers. Typically, each optical fiber is provided with an relatively thin inner jacket portion and an environmentally protective outer jacket therearound. Two such outer jackets connecting are joined together, much like lamp cord ("zip cord") to form a dual or duplex cable. However, neither the inner nor the outer jacket is intended as a structural member; that is, they are not intended to resist strain forces and the like applied to the cable, such as at entry or exit points of enclosures, or where the fiber is to be joined to a connector, or the like. Rather, an additional quantity of fibrous strengthening material such as a Kevlar (polyaramid) fiber is usually provided between the outer jacket and the inner jacket.

Heretofore, data communications fiber optic cables of this type have been joined by applying mating connectors to respective ends of each jacketed fiber which is to be joined. As will be more fully described below, this requires individual preparation of each cable for application of a suitable one of a pair of mating connectors, taking care to maintain a structural bond or connection between the connector and the strengthening material and also to maintain the environmental integrity of the outer jacket. However, the connectors for such fiber optic cables and the process of applying them to the cables can be relatively expensive. Moreover, once cable ends are connectorized, it is a relatively tedious process to remove the connectors and apply new connectors should some problem arise with the integrity of the connection obtained, e.g. the transmission quality across the joined connectors. Moreover, if it is desired to disconnect previously interconnected optical fibers and connect new ones, the new fibers must also be individually assembled with connectors, with the previously used connectors being unusable, thus adding further to the expense of adding or changing connections in a cabling system, for example. The use of a re-enterable splice type connection eliminates many of these problems and expenses associated with the individually connectorized jacketed optical fibers.

However, splicing a data communications cable of the foregoing type requires that the environmental protection function and integrity of the outer jacket as well as the structural function of the fibrous strengthening material be taken into account and accommodated in the structural design of the splicer assembly. In the case of the most commonly used dual or duplex type of data communications fiber optic cable, a splicer assembly must be capable of simultaneously accommodating and splicing the two optical fibers, while maintaining the above mentioned respective environmental and structural functions of the outer jackets and fibrous material associated with each of the two optical fibers.

Summarizing, in the dual or duplex type of data communications cable the outer jackets of the two fibers of the cable are physically joined along respective outer surfaces thereof. Since the cable jackets are generally circular in cross-section, the surfaces which are joined generally define a long relatively thin web along which the two outer jackets essentially abut. Thus, a problem arises in splicing a cable of this type as to how to strip back the outer jacket and fibrous strengthening material to permit access to the underlying optical fiber for splicing within a splicer assembly, while yet maintaining the environmental protective function of the outer jacket and the strengthening function of the fibrous strengthening material when the splice has been accomplished.

As an additional matter, it is difficult to properly align two fibers in a parallel side-by-side arrangement to achieve a splice between the two fibers of one duplex data communications cable and another, as described above. In this regard, it is necessary to maintain four separate elements in position simultaneously, that is, to maintain the ends of each of the two fibers of one duplex cable in alignment with the ends of the two fibers of the other duplex cable. This in turn requires that force be applied at four points within a splicing structure. Since three points define plane, it is difficult to assure that four points will be held when using a relatively rigid splicing structure.

OBJECTS AND SUMMARY OF THE INVENTION

Accordingly, it is a general object of this invention to provide a novel and improved fiber optic splicer assembly for forming a splice connection between ends of a pair of fiber optic cables.

A more specific object is to provide a splicer assembly for a fiber optic cable which comprises an optical fiber having an outer jacket and a quantity of fibrous strengthening material between the outer jacket and the optical fiber.

A yet more specific object is to provide a splicer assembly for splicing together a pair of fiber optic cables, each of which includes a pair of optical fibers, each having an outer jacket and a quantity of fibrous strengthening material between the outer jacket and the optical fiber, the outer jackets being joined longitudinally.

Briefly, and in accordance with the foregoing objects, a re-enterable splicer assembly for forming a splice connection between respective ends of a pair of fiber optic data communications cables, each cable comprising at least one optical fiber surrounded by an outer jacket and a quantity of fibrous strengthening material intermediate the outer jacket and the optical fiber, comprises an elongate housing having a pair of outer housing sections and an intermediate housing section between the outer housing sections, each of said sections being configured for receiving said outer jacket of at least one optical fiber, and said intermediate sections defining a splice-receiving area; a splice portion mounted in said splicer-receiving area and having an elongate channel for receiving respective ends of a pair of optical fibers, releasable fiber retaining means for holding said ends of said received optical fibers in said elongate channel, and splicer opening means for permitting entry to said splice portion to facilitate insertion and removal of a fiber relative to said elongate channel; and material securing means for securing said fibrous strengthening material relative to said elongate housing.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 3 is an exploded perspective view of the splicer assembly of FIG. 2;

FIG. 4 is a top plan view, partially broken away, of the splicer assembly of the invention and a pair of data communications cables being spliced thereby;

DETAILED DESCRIPTION OF THE ILLUSTRATED EMBODIMENT

Figure 1:
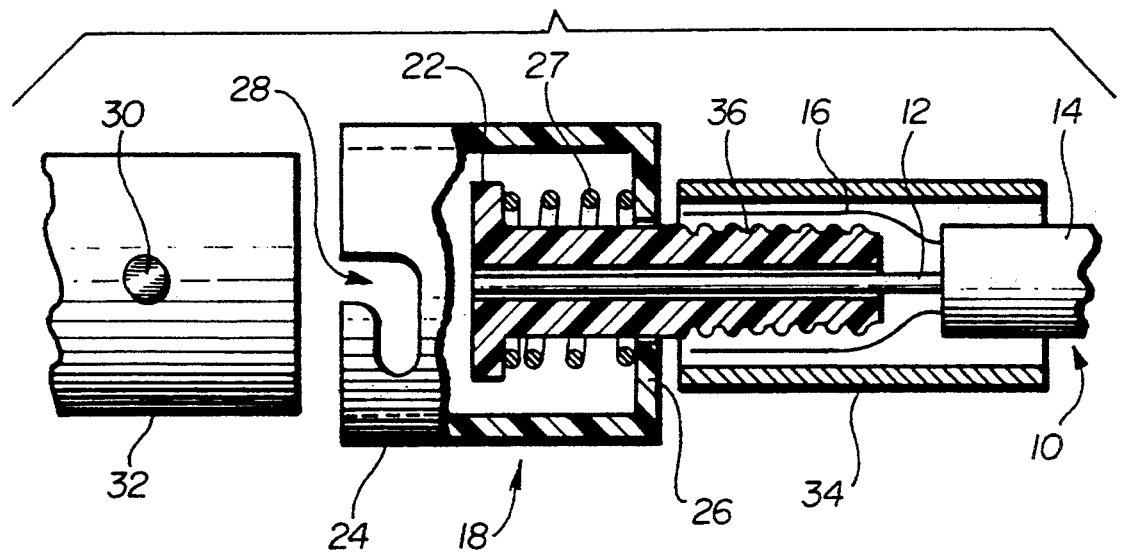
FIG. 1 is a partial side elevation, partially broken away, of a prior art connector arrangement for joining data communications fiber optic cables.

Referring now to the drawings, and initially to FIG. 1, the prior art has generally provided only for connector-type couplings between fiber optic cables of the type generally used in data communications. Generally speaking, such a cable 10 comprises an optical fiber 12 surrounded by an environmentally protective outer jacket 14. A quantity of fibrous material such as Kevlar (polyaramid) is wound about the fiber 12 and thus located intermediate the fiber 12 and outer jacket 14. This fibrous material 16 imparts structural strength and integrity to the cable 10.

Moreover, such cables 10 are most frequently provided as a duplex cable, that is, comprising two fibers 12, each surrounded by strengthening material 16 and an outer jacket 14, with the outer jackets being joined longitudinally to form a "zip cord" type of structure. Thus, when it has been desired heretofore to effect connections between respective duplex cables of this type, it has been necessary to peel apart the outer jackets 14 and separately prepare each of the fibers for application of a connector.

A typical connector of the ST type is indicated generally by reference numeral 18 in FIG. 1. Generally speaking, the connector 18 comprises a fiber-receiving ferrule portion 20 which has an enlarged lip portion 22. A generally cylindrical coupling member 24 has an apertured end wall 26 through which the ferrule 20 projects to receive the optical fiber 12 and be coupled with the outer jacket 14 and fibrous strengthening material 16 of the cable 10. A compression spring 26 is interposed between the lip 22 and the end wall 26 of the coupling member 24. The coupling 24 may be a bayonet type coupling having an L-shaped slot 28 for coupling with a projecting post 30 of a mating connector member 32. The mating connecting member 32 most commonly takes the form of what is referred to in the art as an adapter, and has oppositely projecting posts or pins 30 at either end thereof for receiving a similar coupling member 24 at either end.

In order to retain the environmental protective function of the outer jacket 14 and the structural strength function of the fibrous material 16, a cylindrical, open-ended tube 34 is often engaged about a projecting end portion 36 of the ferrule 20 which is preferably radially grooved or serrated, such that the fibrous material 16 is firmly retained by the tube 34 which is also crimped or sealed about an end portion of the end jacket 14. It will be seen from the foregoing that the application of a connector 18 to a cable of this type requires a number of steps including the preparation of the cable 10, alignment of the various parts, application of a crimping member 34 and the use of a suitable tool to complete the crimping thereof about the outer jacket 14 and fibrous material 16 overlying the serrated projecting end part 36 of the ferrule 20.

Figure 2:
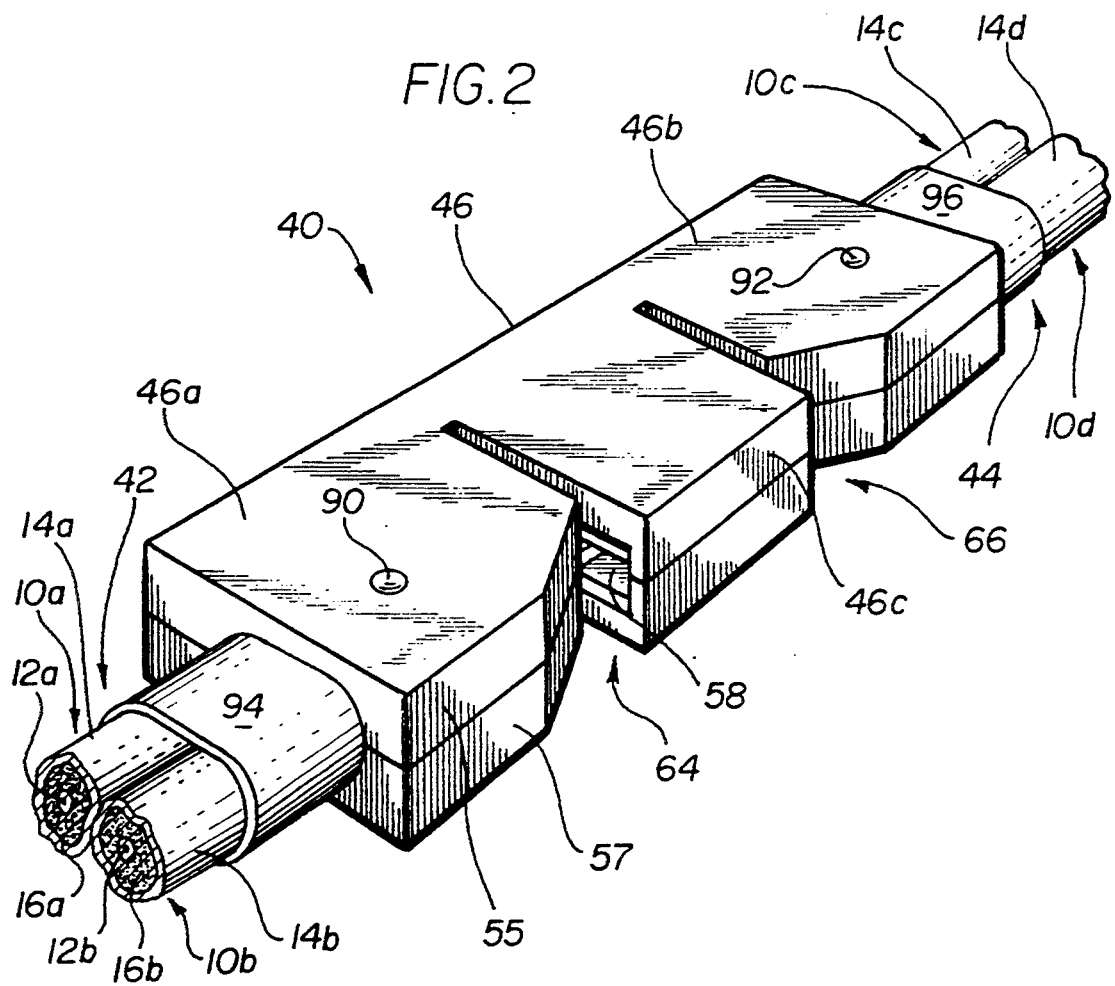
FIG. 2 is an assembled perspective view of a splicer assembly in accordance with the invention and a pair of data communications cables being spliced thereby.
Figure 5:
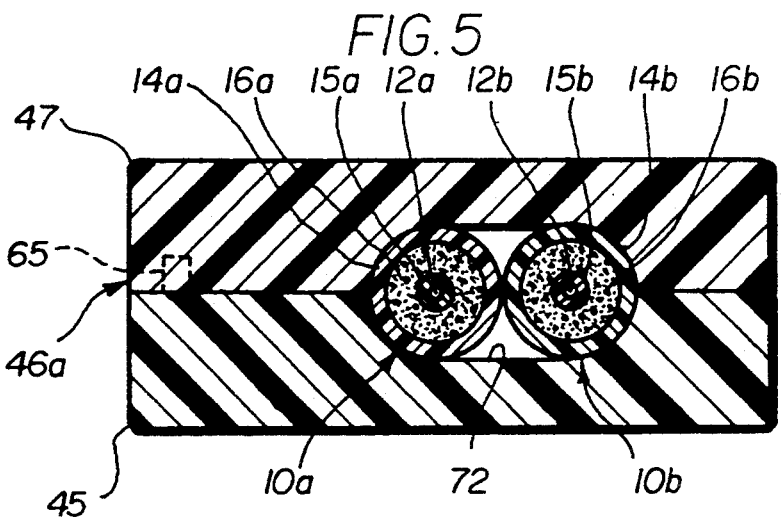
FIG. 5 is an enlarged sectional view taken generally in the plane of the line 5—5 of FIG. 4.
Figure 6:
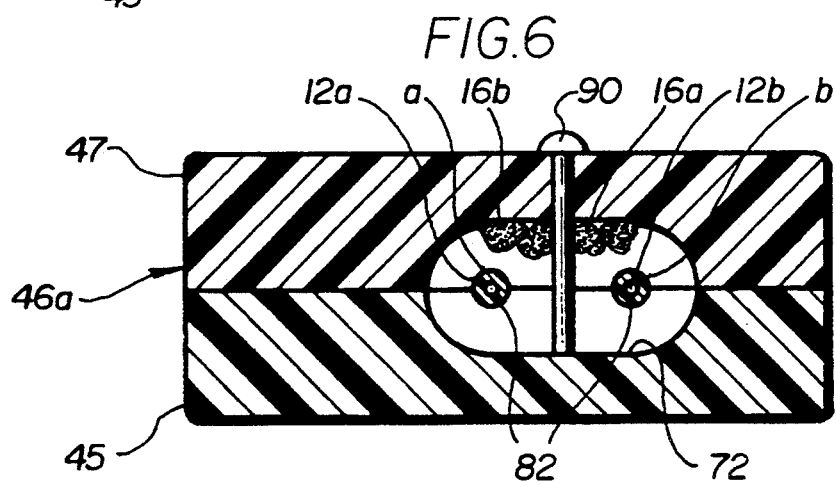
FIG. 6 is an enlarged sectional view taken generally in the plane of the line 6—6 of FIG. 4.

Referring now to the remaining figures of drawings, and initially to FIGS. 2–4, the present invention provides a novel re-enterable splicer assembly 40 for forming a re-enterable splice connection between respective ends of at least one pair of fiber optic cables. In the illustrated embodiment, the splicer assembly 40 of the invention is shown in connection with a pair of duplex type data communications cables 42, 44 of the type described hereinabove. The parts of the two fiber optic cables of respective duplex cables 42 and 44 joined at the splicer 40 are designated by the same reference numerals used in FIG. 1, together with respective suffixes a, b, c and d.

The splicer assembly in accordance with the invention comprises an elongate outer housing member 46, preferably formed of a polymer which is configured for receiving respective outer jackets 14a, 14b, 14c and 14d of the respective duplex cables 42, 44, at outer housing sections 46a, 46b thereof. A center or intermediate housing section 46c has a splice-receiving area 47 configured for receiving a splice portion or assembly 48. The splice portion or assembly 48 comprises respective first and second splice members 50, 52 which receive respective optical fiber portions 12 of respective cables 42, 46 and effect a splice therebetween. In this regard, the intermediate section 46c of the housing 46 forms a clamshell-like enclosure for resiliently pressing the first and second splice members 50, 52 together about respective optical fibers to effect such a splice therebetween.

The splice portion 48 has elongate channels 54 formed therein for receiving and effectively joining respective ends of the fibers to be spliced thereby. Means are provided for releasably retaining ends of the optical fibers within these channels 54. In the illustrated embodiment, this releasable retaining is accomplished by providing the first and second complementary splice members 50, 52 joined together in a clamshell-like configuration to retain or clamp fibers therebetween and within the channels 54. In the illustrated embodiment, the channels 54 are formed on the first or bottom splice member 50.

Cooperatively, the second or upper splice member 52 is formed with a fiber-engaging surface portion 56 which is located and configured for overlying and retaining fibers within the channels 54. Preferably, the first and second splice members 50, 52 are formed from a material such as an aluminum alloy which has a selected or predetermined hardness. At least one of the surfaces which engages each of the fibers within channels 54 comprises a layer of material of a second hardness less than the hardness of the material from which the splice members 50 and 52 are formed.

In the illustrated embodiment, this layer defines the surface 56, and may be formed by depositing a relatively thin layer of a somewhat softer material upon the surface of the splice member 52. This material may comprise a paint-like coating of a material selected for a hardness somewhat less than the hardness of the splice members 50 and 52 and also less than the hardness of the fibers to be joined in the channel 54, such that the surface 56 can give somewhat to assure good point contact with at least one point on each of the optical fibers entering the channels 54 so as to retain optical fibers spliced therein.

Figure 8:
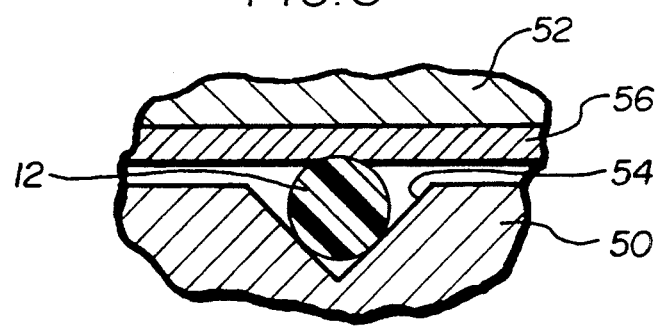
FIG. 8 is an enlarged partial view of a portion of FIG. 7.

In the illustrated embodiment, this contact with the fibers occurs at four points, that is, one point on each of the fibers to be retained and spliced within the channels 54. Such contact between the surface 56 and fibers 12a, 12b within channels 54 is illustrated in FIG. 8. It should be noted that other arrangements may be employed to retain fibers aligned and spliced within the splice portion without departing from the invention. For example, both of the splice members 50 and 52 might contain complementary channels, and the surfaces of one or both such channels might be coated with a material of selected hardness for causing engagement and retention of the fibers as described above. Moreover, the channels 54 of the illustrated embodiment might also be provided with such a "softer" surface, without departing from the invention.

An elongated tool-receiving aperture or opening 58 is formed in the splice portion 48 generally parallel to the elongate channels 54 and to one side thereof for receiving a tool 59 for partially opening the splice portion to facilitate the insertion and release of a fiber relative to the channels 54. In the illustrated embodiment, substantially one-half of this tool-receiving opening 58 is formed in each of the splice members 50 and 52.

In the illustrated embodiment, the housing 40 is formed of substantially similar, and preferably mirror-image housing halves 55 and 57 which are rigidly joined together longitudinally along facing sides 60, 62 thereof which are generally parallel to the elongate channels 54 and to a side thereof generally opposite the tool-receiving opening 58. The two outer housing sections 46a and 46b are also rigidly joined along their opposite longitudinal edge, that is, opposite to the edges 60, 62, such that these outer housing sections 46a, 46b are rigidly joined on both sides of the channels 54. Thus, only the middle or intermediate housing section 46c is free to flex or move in a generally vertical direction at its edge opposite the edges 60, 62 to form the clamshell-like enclosure for resiliently pressing the first and second splice members 50, 52 together about fibers received in the channels 54 as described hereinabove. Cooperatively in this regard, at least the upper housing half 55 additionally includes a pair of through slots or openings 61, 63 which are to either side of and generally define the intermediate section 46c to facilitate the clamshell-like flexing thereof in response to operation of the tool 59.

In this regard, the housing 46 also includes access means which in the illustrated embodiment take the form of a pair of generally angular cut away portions or cut outs 64, 66 to permit entry of a tool for engagement with the tool-receiving opening 58 of the splice portion 48 for overcoming the pressing together of the splice elements by the intermediate housing section 46c to permit insertion or removal of fibers relative to the channels 54.

Preferably, the tool 59 includes a shank portion 68 and a grasping portion 70. The shank portion 68 is generally complementary in cross-section with the generally rectangular cross-sectional configuration of the opening 58, such that rotation of the tool 90° will part the members 50, 52 sufficiently to permit insertion or removal of a fiber relative to channels 54. Moreover, the shank 68 is of such a length that insertion and operation of the tool from one end of the opening 58 will permit the insertion and removal of fibers only from that end of the splicer 40 without disturbing fibers previously inserted from the opposite end.

Each of the outer sections 46a, 46b of the housing has at least one longitudinal fiber optic cable-receiving aperture 71 formed therethrough. This aperture comprises an outer aperture section 72, 74 sized to receive a fiber optic cable outer jacket 14. In the case of the duplex data communications cable illustrated herein, the outer aperture sections 72, 74 are configured for receiving side-by-side outer jackets 14a, 14b and 14c, 14d, respectively. A second or inner aperture section 76, 78 is sized to receive the optical fiber portion of each cable therein. The illustrated embodiment also includes intermediate aperture sections 80, 82 which are between the inner and outer aperture sections, and which are configured for receiving an inner jacket portion 15 of each of the fiber optic cables which is intermediate the fibrous strengthening material 16 and the optical fiber 12 of each cable. In each instance, the inner aperture section 76, 78 is aligned with one of the elongate channels 54 of the splice portion 48.

A strain relief element in the form of a projection or tooth 84 may also be formed in each of the intermediate aperture sections 80, 82 for impinging upon the inner jacket portion of each of the fiber optic cables 10. Sets of mating projections or posts and recesses or apertures 55, 57 are provided for aligning the respective splice members 50 and 52. Similarly, interfitting sets of projecting posts 61 and complementary receiving recesses 63 are provided for aligning the housing halves 55 and

57. A raised ridge or rib 85 is preferably provided interiorly of the splice receiving area 47, on each of the housing halves 55 and 57 for impinging upon and providing additional force pressing together the respective splice members 50 and 52 along a line thereon generally parallel to and midway between the channels 54.

Figure 7:
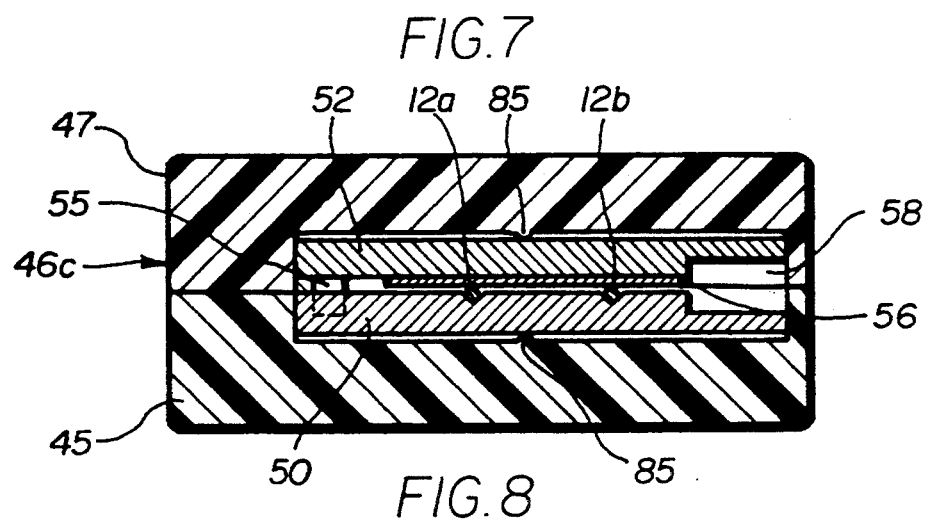
FIG. 7 is an enlarged sectional view taken generally in the plane of the line 7—7 of FIG. 4.

In accordance with another feature of the invention, means are also provided for securing the fibrous strengthening material 16 of each of the cables 10 relative to the housing 46. In the illustrated embodiment, this securing means takes the form of transverse openings formed in the respective outer sections 46a, 46b and extending inwardly of the housing 46 to an area adjacent the fiber optic cables extending therethrough, preferably near an inner end of each outer aperture section 72, 74, that is near where they meet or merge with the intermediate aperture sections 80, 82. Each of these openings 86, 88 receives a pin 90, 92 therethrough for engaging the fibrous strengthening material 16 of respective fiber optic cables passing through the outer housing sections 46a, 46b, as best viewed for example in FIGS. 4 and 7. Preferably, the openings 86, 88 extend, as shown, to an area where the outer jacket 14 of each of the cables terminates interiorly of the housing so as to engage the fibrous strengthening material 16 as it emerges from the outer jacket 14. In this regard, preferably the duplex cables are initially prepared by stripping back the outer jacket and by managing or tying back in a half knot the protruding portions of the strengthening fibers 16 from each cable 10. These protruding lengths of fibrous material are then drawn back outwardly along the sides of the outer jackets 14, prior to the insertion of each cable into the splicer 40. The pins 90 and 92 thereby serve to secure the strengthening material to the housing 46.

Furthermore, respective elastic bands or shrink collars 94, 96 may be slidably engaged with respective outer jackets 14 and moved to a position abutting either outer end of the housing 46 to surroundingly engage and overlie the respective protruding ends of the fibrous strengthening material 16.

Each optical fiber 12 is normally provided with a relatively thin buffer layer or outer surface of a plastic material for environmental protection, and in particular to avoid absorption of hydroxyl molecules by the glass fiber material of the fibers 12. This buffer is preferably stripped away prior to the introduction of each of the fibers in the channels 54 of the splice portion 48. In order to assure completion of the optical path between respective abutting ends of fibers held in the channels 54, a quantity of a gel material having optical properties similar to those of the respective fibers is preferably also introduced into the channels 54. This gel may also serve to environmentally protect the optical fibers, in place of the buffer layer which was stripped from the fibers prior to their insertion to the channels 54.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A re-enterable splicer assembly for releasably connecting respective ends of a pair of fiber optic cables, each cable comprising at least one optical fiber surrounded by an outer jacket and a quantity of fibrous strengthening material intermediate the outer jacket and the optical fiber, said splicer assembly comprising:

an elongate housing having a pair of outer housing sections and an intermediate housing section between the outer housing sections, each of said outer housing sections being configured for receiving said outer jacket of at least one optical fiber, and said intermediate housing section defining a splice-receiving area;

a splice portion having first and second complementary splice members mounted in said splice-receiving area and having an elongate channel for receiving and effectively joining respective ends of a pair of optical fibers, releasable fiber retaining means for holding said ends of said received optical fibers in said elongate channel, and splicer opening means being operable with said first and second complementary splice members for permitting entry to said splice portion to facilitate insertion and removal of a fiber relative to said elongate channel;

material securing means for securing said fibrous strengthening material relative to said elongate housing, said housing being formed of substantially similar housing halves rigidly joined together longitudinally along a side thereof generally parallel to and to one side of said elongate channel and wherein said intermediate section forms a clamshell-like enclosure for resiliently pressing said first and second splice members together about fibers received in said elongate channel.

2. A re-enterable splicer assembly according to claim 1 wherein said splice portion comprises first and second complementary splice members formed of a material having a first hardness and wherein said fiber retaining means comprises a fiber-engaging surface portion on at least one of said first and second splice members which comprises a layer of material of a second hardness less than said first hardness, said fiber-engaging surface portion being configured and located for engaging optical fibers received within said elongate channels.

3. A re-enterable splicer assembly according to claim 2 wherein said first and second splice members are formed of an aluminum alloy.

4. A re-enterable splicer assembly according to claim 3 wherein said opposite outer housing sections are rigidly joined longitudinally to both sides of the elongate channels formed in said splice portion.

5. A re-enterable splicer assembly according to claim 1 wherein said splicer opening means comprises a tool-receiving aperture formed in said splice portion and wherein said housing includes an access area formed therein for permitting entry of a tool for engagement with said tool-receiving aperture for overcoming the pressing together of said first and second splice members by said intermediate section of said housing to permit one of insertion and removal of a fiber relative to said elongate channel.

6. A re-enterable splicer assembly according to claim 5 wherein said access area comprises an access opening formed in said housing to either side of said intermediate section for a mating tool to be inserted into said tool-receiving opening of said splice portion from either side thereof to permit the insertion and removal of a fiber from one end of said splice portion independently of the insertion and removal of a fiber from an opposite end of said splice portion, without disturbing an optical fiber previously inserted from said opposite end of said splice portion.

7. A re-enterable splicer assembly according to claim 1 wherein said opposite outer housing sections are rigidly joined on both sides of the elongate channel.

8. A re-enterable splicer assembly according to claim 1 wherein each of said outer sections of said housing has at least one longitudinal fiber optic cable-receiving aperture formed therethrough comprising an outer aperture section sized to receive a fiber optic cable outer jacket, and an inner aperture section sized to receive an optical fiber therein and in alignment with the elongate channel of said splice portion for guiding said optical fiber into said elongate channel.

9. A re-enterable splicer assembly according to claim 8 and further including strain relief structure formed in said cable-receiving apertures for engaging predetermined portions of optical fibers held therein for providing strain relief for the associated optical fibers.

10. A re-enterable splicer assembly according to claim 1 wherein said splice portion has a second elongate channel formed therein parallel to said elongate channel for receiving and effectively joining optical fiber members of a second pair of fiber optic cables and wherein said outer housing sections are configured for receiving outer jackets of a pair of side-by-side fiber optic cables therein and for guiding an optical fiber portion of each of said side-by-side fiber optic cables into engagement with one of said elongate channels of said splice portion.

11. A re-enterable splicer assembly according to claim 10 wherein said splice portion comprises first and second complementary splice members formed of a material having a first hardness and wherein said retaining means comprises a fiber-engaging surface portion on at least one of said first and second splice members which comprises a layer of material of a second hardness less than said first hardness, and wherein said fiber-engaging surface portion is configured and located for engaging optical fibers received in both of said elongate channels.

12. A re-enterable splicer assembly according to claim 10 wherein said securing means comprises a transverse opening in each of said outer housing sections and a pin member sized to interfit with said transverse opening for engaging the fibrous strengthening material of both fiber optic cables in each of said outer housing sections.

13. A re-enterable splicer assembly according to claim 1 wherein said securing means comprises a transverse opening extending inwardly of each of said outer housing sections and a pin member sized to interfit in said transverse opening for engaging the fibrous strengthening material of the fiber optic cables in said outer housing sections.

14. A re-enterable splicer assembly for releasably connecting respective ends of two pairs of fiber optic cables, each cable comprising at least one optical fiber surrounded by an outer jacket and a quantity of fibrous strengthening material intermediate the outer jacket and optical fiber, said splicer assembly comprising:

an elongate housing having a pair of outer housing sections and an intermediate housing section between the outer housing sections, each of said outer housing sections being configured for receiving said outer jacket of at least one pair of optical fibers, and said intermediate section defining a splice-receiving area;

a splice portion mounted in said splice-receiving area and having a pair of parallel elongate channels formed thereon for receiving and effectively joining respective ends of two pairs of optical fibers, releasable fiber retaining means for retaining said ends of said optical fibers received in said elongate channels, and splicer opening means for partially opening said splice portion to facilitate inserting and releasing a fibers relative to said channels;

and material securing means for securing said fibrous strengthening material relative to said housing;

said housing formed of substantially similar housing halves rigidly joined together longitudinally along a side thereof generally parallel to and to one side of said elongate channels in said splice portion; and wherein said intermediate section forms a clamshell-like enclosure for resiliently pressing said first and second splice members together about fibers received in said channels.

15. A re-enterable splicer assembly according to claim 14 wherein said splice portion comprises first and second splice members formed of a material having a first hardness and wherein said retaining means comprises a fiber-engaging surface portion on one of said first and second splice members comprising a layer of material of a second hardness less than said first hardness, said fiber-engaging surface portion being configured and located for engaging optical fibers received within both of said pair of elongate channels.

16. A re-enterable splicer assembly according to claim 14 wherein said splicer opening means comprises a tool-receiving aperture formed in said splice portion generally parallel to and to a side of said elongate channels opposite said one side and wherein said housing includes access means formed therein for permitting entry of a tool for engagement with said tool-receiving aperture of said splice portion for overcoming the pressing together of said first and second splice elements by said intermediate section of said housing to permit one of insertion and removal of a fiber relative to said channels.

* * * * *